June 19, 1928. C. A. MASSING Re. 17,005

COOKING UTENSIL

Original Filed Dec. 21, 1925

INVENTOR.
Charles A. Massing
BY
ATTORNEYS.

Reissued June 19, 1928.

Re. 17,005

UNITED STATES PATENT OFFICE.

CHARLES A. MASSING, OF MILLCREEK TOWNSHIP, ERIE COUNTY, PENNSYLVANIA, ASSIGNOR TO THE GRISWOLD MANUFACTURING COMPANY, OF ERIE, PENNSYLVANIA, A CORPORATION OF PENNSYLVANIA.

COOKING UTENSIL.

Original No. 1,665,037, dated April 3, 1928, Serial No. 76,605, filed December 21, 1925. Application for reissue filed May 10, 1928. Serial No. 276,721.

This invention is designed to provide a cooking utensil, as for example a skillet with a cover which will seal the utensil notwithstanding the pouring spouts which are ordinarily arranged on such utensils, a single construction of cover being used with such utensils having differently arranged spouts. Features and details of the invention will appear from the specification and claim.

The invention is exemplified and illustrated as a preferred embodiment in the accompanying drawings as follows:—

Figure 1:
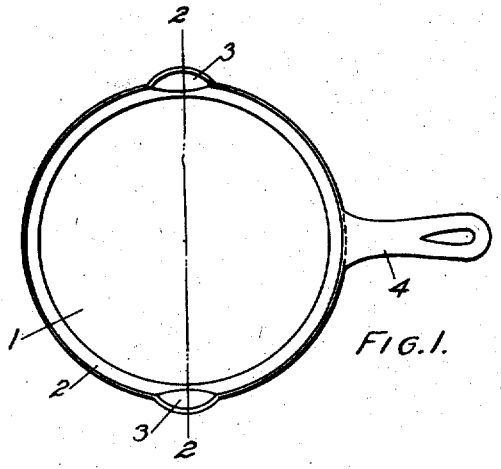

Fig. 1 shows a plan view of a skillet.

Figure 2:
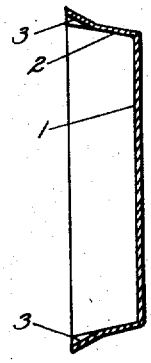

Fig. 2 a section on the line 2—2 in Fig. 1.

Figure 3:
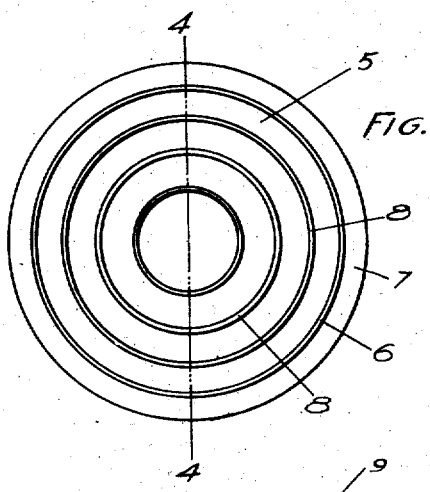

Fig. 3 a bottom view of the cover.

Figure 4:
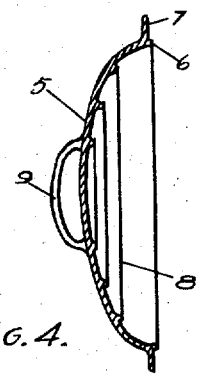

Fig. 4 a section on the line 4—4 in Fig. 3.

Figure 5:
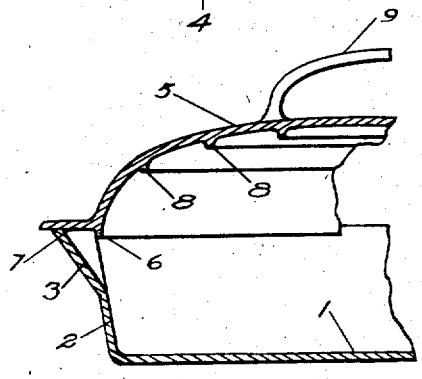

Fig. 5 a section of the skillet and cover in place thereon.

1 marks the skillet bottom, 2 the side walls of the skillet, 3 pouring spouts on the skillet and 4 the handle. A cover 5 has a peripheral rib 6 designed to fit within the walls 2 of the cover. The cover also has an outwardly extending lip or flange 7 which rests on the top edge of the wall 2 and is of sufficient width to extend over the upper edge of the pouring spout. The pouring spout is so formed with relation to the under surface of the lip 7 as to make a closure.

The cover has the drip rings 8 and handle 9.

With this construction it is desirable to retain the juices within the skillet and the distribution of the condensation is facilitated by the drip rings.

It will be noted that with the over-hanging flange 7 the cover may be placed on the utensil without regard to any particular location circumferentially of the cover relatively to the edge of the utensil. Consequently there is a greater convenience in placing the cover on the utensil than where the cover is fashioned at the spouts to fit the utensil. Further the construction of the cover is simplified.

What I claim as new is:—

The combination of a cooking utensil having a pouring lip; and an imperforate cover having a surrounding rib extending downwardly along the inner surface of the wall of the utensil and a surrounding flange extending outwardly from the rib, the flange having a contour and width relatively to the pouring lip sealing the pouring lip with the cover turned in any position circumferentially on the utensil.

In testimony whereof I have hereunto set my hand.

CHARLES A. MASSING.